United States Patent [19]

Culbertson et al.

[11] Patent Number: 4,806,267
[45] Date of Patent: Feb. 21, 1989

[54] LIQUID AROMATIC BISOXAZOLINE AND BISOXAZINE MONOMER MIXTURES AND PROCESS FOR CROSSLINKING USING PHENOLICS

[75] Inventors: Billy M. Culbertson, Worthington; Omar Tiba, Dublin, both of Ohio

[73] Assignee: Ashland Oil, Inc., Ashland, Ky.

[21] Appl. No.: 144,142

[22] Filed: Jan. 15, 1988

[51] Int. Cl.$^4$ .................. C08G 65/40; C08G 69/44; C08G 69/40
[52] U.S. Cl. .................. 252/182.23; 252/182.18; 528/153; 528/148; 528/149; 528/150; 528/154; 528/155; 528/158; 528/162; 528/163; 528/172; 528/208; 528/210; 528/212
[58] Field of Search .................. 252/182.23

[56] References Cited

U.S. PATENT DOCUMENTS 4,430,491  2/1984  Culbertson et al. .................. 528/153

Primary Examiner—John Kight
Assistant Examiner—Frederick Krass
Attorney, Agent, or Firm—John F. Jones

[57] ABSTRACT

Compositions having melting points below 100° C. which are useful in the formation of resins by reaction with polyphenolic compounds consisting of a mixture of more than two compounds having the formula

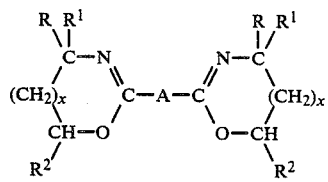

wherein A represents a cyclic or acyclic aliphatic or substituted cyclic or acyclic aliphatic moiety having from 1 to 20 carbon atoms or an aromatic mono- or multi-nuclear or aliphatic substituted aryl residue having from 6 to 20 carbon atoms, R independently represents H, $CH_3$, $CH_2CH_3$ or $C_6H_5$, $R^1$ independently represents H or $CH_3$, $R^2$ independently represents H or $CH_3$, and x represents an integer from 0 to 2 as described.

3 Claims, No Drawings

LIQUID AROMATIC BISOXAZOLINE AND BISOXAZINE MONOMER MIXTURES AND PROCESS FOR CROSSLINKING USING PHENOLICS

This invention relates to liquid aromatic bisoxazoline and/or bisoxazine monomer mixtures and more particularly pertains to mixtures of these monomers combined with aromatic compounds containing both an oxazoline and an oxazine ring on the same molecule and to a process for preparing these mixtures via blending or preferably by a one-step synthesis procedure. The liquid to low melting mixtures (liquid below 100° C.) of bisoxazolines and bisoxazines which result from these processes are useful as chain extenders and crosslinkers for active hydrogen monomers, oligomers and polymers.

The use of individual bisoxazolines for chain extension and crosslinking of polyphenolic compounds has been described in U.S. Pat. No. 4,430,491 and the use of bisoxazolines in the crossinking of materials containing mercaptan or thiol groups, carboxylic acid groups, and both carboxylic acid and phenolic groups is also known.

The pure forms of the 1,3-phenylene-bisoxazoline, 1,4-phenylene-bisoxazoline, 1,3-phenylene bisoxazine and/or 1,4-phenylene-bisoxazine used in the prior art for chain extension and for crosslinking purposes individually are relatively high melting, crystalline compounds which are not readily mixed at low temperatures with the oligomeric or polymeric materials used in the crosslinking reactions. It is highly desirable to have bisoxazolines and/or bisoxazines which are liquids at ambient conditions or low melting solids, in order to facilitate mixing at low temperatures, obviating the need of solvents or the use of high temperatures during applications stage. The liquid bisoxazolines/bisoxazines mixtures of this invention allow one to have a much greater processing window prior to the subsequent curing stage or crosslinking/chain extension stage between the bisoxazoline, bisoxazine, etc., and the active hydrogen containing monomers, oligomers or polymers. Further, in the homopolymerization of bisoxazolines or monomer mixtures thereof it is best to have these materials in the liquid state at low temperatures, lending flexibility to their use without solvent.

We have discovered that mixtures of liquid or low melting, aromatic bisoxazolines, bisoxazines and combinations thereof may be produced in a convenient one-step reaction from a blend of an aromatic dinitrile or dinitriles by reaction with a blend of amino alcohols. A two step reaction may also be used, starting with mixtures of aromatic dicarboxylic acid esters and amino alcohols, followed by subsequent cyclodehydration of the produced aromatic diamide diols. However, this procedure is less preferred because it is a two-step method. Also, the various aromatic bisoxazolines, bisoxazines, etc. compounds may be made independently and subsequently blended (mixed) in various ratios to obtain low melting mixtures of bisoxazolinesbisoxazines. However, this latter procedure is also less preferred since it requires much greater effort to produce a large number of compounds for blending and there is no convenient procedure for production of aromatic or aliphatic compounds in a pure state with mixed oxazoline-oxazine ring systems on the same molecule. We have found that the first (one-step reaction) procedure is most convenient (preferred) since it requires only a single step and does not require independent preparation of a large number of bisoxazolines, bisoxazines, etc., having subsequent attempted mixing of these various compounds.

Oxazolines useful in the mixtures of this invention include more than one structurally dissimilar compounds having at least two oxazoline, two oxazine, or two tetrahydrooxazepine groups per molecule and/or molecules with both an oxazoline and an oxazine, an oxazoline and tetrahydrooxazepine or an oxazine and tetrahydrooxazepine residue on the same molecule, preferably prepared in a one-step reaction from treatment of various amino alcohols mixtures with dinitrile or dinitrile mixtures.

Bisoxazolines, bisoxazines, and bis-tetrahydrooxazepines compounds or compounds with mixed oxazoline, oxazine, and tetrahydrooxazepine moieties in the same molecules include mixtures of two or more compounds of the following General Formula.

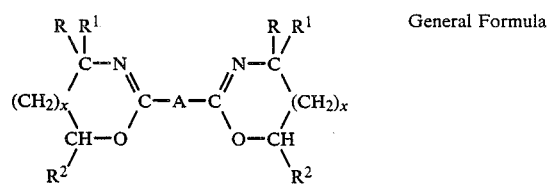

General Formula wherein

A represents a cyclic or acyclic aliphatic or substituted cyclic or acyclic aliphatic moiety having from 1 to 20 carbon atoms or an aromatic (aryl) mono- or multinuclear or aliphatic substituted aryl residue having from 6 to 20 carbon atoms;

R independently represents H, $CH_3$, $CH_2-CH_3$, or $C_6H_5$, $R^1$ independently represents H or $CH_3$, $R^2$ independently represents H or $CH_3$, and x represents an integer of from 0 to 2.

We have discovered a method for producing mixtures of compounds of the above General Formula, in one step, which mixtures are useful as chain extenders and/or crosslinkers for active hydrogen materials. Representative compounds which can be produced in the form of mixtures of two or more compounds of the General Formula in this invention include:

4,4'-tetrahydro-2,2'-bisoxazole,
5,5',6,6'-tetrahydro-2,2'-bis(4H-1,3-oxazine),
2,2'-alkanediyl-bis[4,5-dihydrooxazole], and
2,2'-alkanediyl-bis[5,6-dihydro-4H-1,3-oxazine], e.g.,
2,2'-(1,4-butanediyl)bis[4,5-dihydrooxazole]
2,2'-(1,4-butanediyl)bis[5,6-dihydro-4H-1,3-oxazine]
2,2'-(1-methyl-1,3-propanediyl)bis[4,5-dihydrooxazole]
2,2'-(1-methyl-1,3-propanediyl)bis[5,6-dihydro-4H-1,3-oxazine]
2,2'-(1,3-propanediyl)bis[4,5-dihydrooxazine]
2,2'-(1,3-propanediyl)bis[5,6-dihydro-4H-1,3-oxazine]
2,2'-(1,2-ethanediyl)bis[4,5-dihydrooxazole]
2,2'-(1,2-ethanediyl)bis[5,6-dihydro-4H-1,3-oxazine]
2,2'-(1,8-dodecanediyl)bis[4,5-dihydrooxazole]
2,2'-(1,8-dodecanediyl)bis[5,6-dihydro-4H-1,3-oxazine]
2,2'-(1,6-hexanediyl)bis[4,5-dihydrooxazole]
2,2'-(1,6-hexanediyl)bis[5,6-dihydro-4H-1,3-oxazine]
2,2'-(1,4-cyclohexanediyl)bis[4,5-dihydrooxazole]
2,2'-(1,4-cyclohexanediyl)bis[5,6-dihydro-4H-1,3-oxazine]
2,2'-(arylene)bis[4,5-dihydrooxazole] and 2,2'-(arylene)bis[5,6-dihydro-4H-1,3-oxazine], e.g.,
2,2'-(1,4-phenylene)bis[4,5-dihydrooxazole]
2,2'-(1,4-phenylene)bis[5,6-dihydro-4H-1,3-oxazine]
2,2'-(1,3-phenylene)bis[4,5-dihydrooxazole]
2,2'-(1,3-phenylene)bis[5,6-dihydro-4H-1,3-oxazine]
2,2'-(1,5-naphthalenyl)bis[4,5-dihydrooxazole]
2,2'-(1,5-naphthalenyl)bis[5,6-dihydro-4H-1,3-oxazine]
2,2'-(1,8-anthracenyl)bis[4,5-dihydrooxazole]
2,2'-(1,8-anthracenyl)bis[5,6-dihydro-4H-1,3-oxazine]
2,2'-(2,6-naphthalenyl)bis[4,5-dihydrooxazole]
2,2'-(2,6-naphthalenyl)bis[5,6-dihydro-4H-1,3-oxazine]
2,2'2''-(1,3,5-phenylene)tris[4,5-dihydrooxazole]
2,2'2''-(1,3,5-phenylene)tris[5,6-dihydro-4H-1,3-oxazine]
2,2'-(5-t-butyl-1,3-phenylene)bis[4,5-dihydrooxazole]
2,2'-(5-t-butyl-1,3-phenylene)bis[5,6-dihydro-4H-1,3-oxazine]
2,2'-(trimethyl-4,5-phenylindanyl)bis[4,5-dihydrooxazole]
2,2'-(trimethyl-4,5-phenylindanyl)bis[5,6-dihydro-4H-1,3-oxazine]

A sulfonyl, oxy, thio or alkylene bis-2-(arylene)[4,5-dihydro-oxazole] or [5,6-dihydro-4H-1,3-oxazine], e.g.,
sulfonyl bis-1,1'-(phenylene)-4,4'-bis[4,5-dihydrooxazole]
sulfonyl bis-1,1'-(phenylene)-4,4'-bis[5,6-dihydro-4H-1,3-oxazine]
oxy bis-1,1'-(phenylene)-4,4'-bis[4,5-dihydrooxazole]
oxy bis-1,1'-(phenylene)-4,4'-bis[5,6-dihydro-4H-1,3-oxazine]
thio bis-1,1'-(phenylene)-4,4'-bis[4,5-dihydrooxazole]
thio bis-1,1'-(phenylene)-4,4'-bis[5,6-dihydro-4H-1,3-oxazine]
methylene bis-1,1'-(phenylene)-4,4'-bis[4,5-dihydrooxazole]
methylene bis-1,1'-(phenylene)-4,4'-bis[5,6-dihydro-4H-1,3-oxazine]

compounds with substituted oxazoline and mixed oxazolineoxazine residues, e.g.,
phenylene-1-[2(4,5-dihydrooxazole)]-4-[2(5,6-dihydro-4H-1,3-oxazine)]
phenylene-1-[2(4,5-dihydrooxazole)]-3-[2(5,6-dihydro-4H-1,3-oxazine)]
2,2'-(1,3-phenylene)-bis[4-methyl-4,5-dihydrooxazole]
phenylene-1-[2(4,5-dihydrooxazole)]-3-[2(4-methyl-4,5-dihydrooxazole)]
phenylene-1-[2(4-methyl-4,5-dihydrooxazole)]-3-[2(5,6-dihydro-4H-1,3-oxazine)]
2,2'-(1,4-phenylene)-bis[4-methyl-4,5-dihydrooxazole]
phenylene-1-[2(4,5-dihydrooxazole)]-4-[2(5,6-dihydro-4H-1,3-oxazine)]
phenylene-1-[2(4-methyl-4,5-dihydrooxazole)]-4-[2(4,5-dihydrooxazole)]
phenylene-1-[2(4-methyl-4,5-dihydrooxazole)]-4-[2(5,6-dihydro-4H-1,3-oxazine)]
2,2'-(1,4-phenylene)-bis[4-ethyl-4,5-dihydrooxazole]
2,2'-(1,3-phenylene)-bis[4-ethyl-4,5-dihydrooxazole]
phenylene-1-[2(4-ethyl-4,5-dihydrooxazole)]-4-[2(4,5-dihydrooxazole)]
phenylene-1-[2(4-ethyl-4,5-dihydrooxazole)]-3-[2(4,5-dihydrooxazole)]
phenylene-1-[2(4-ethyl-4,5-dihydrooxazole)]-4-[2(5,6-dihydro-4H-1,3-oxazine)]
phenylene-1-[2(4-ethyl-4,5-dihydrooxazole)]-3-[2(5,6-dihydro-4H-1,3-oxazine)]
phenylene-1-[2(5-methyl-4,5-dihydrooxazole)]-4-[2(4,5-dihydrooxazole)]
phenylene-1-[2(5-methyl-4,5-dihydrooxazole)]-4-[2(5,6-dihydro-4H-1,3-oxazine)]
2,2'-(1,4-phenylene)-bis[5-methyl-4,5-dihydrooxazole]
phenylene-1-[2(4-ethyl-4,5-dihydrooxazole)]-4-[2(5-methyl-4,5-dihydrooxazole)]
phenylene-1-[2(5-methyl-4,5-dihydrooxazole)]-3-[2(4,5-dihydrooxazole)]
phenylene-1-[2(5-methyl-4,5-dihydrooxazole)]-3-[2(5,6-dihydro-4H-1,3-oxazine)]
2,2'-(1,3-phenylene)-bis[5-methyl-4,5-dihydrooxazole]
phenylene-1-[2(4-ethyl-4,5-dihydrooxazole)]-3-[2(5-methyl-4,5-dihydrooxazole)]
2,2'-(1,3-phenylene)-bis[4-phenyl-4,5-dihydrooxazole]
2,2'-(1,4-phenylene)-bis[4-phenyl-4,5-dihydrooxazole]
phenylene-1-[2(4-phenyl-4,5-dihydrooxazole)]-4-[2(4,5-dihydrooxazole)]
phenylene-1-[2(4-phenyl-4,5-dihydrooxazole)]-3-[2(5,6-dihydro-4H-1,3-oxazine)]
phenylene-1-[2(4-phenyl-4,5-dihydrooxazole)]-4-[2(5,6-dihydro-4H-1,3-oxazine)]
phenylene-1-[2(4-phenyl-4,5-dihydrooxazole)]-3-[2(4-methyl-4,5-dihydrooxazole)]
phenylene-1-[2(4-phenyl-4,5-dihydrooxazole)]-4-[2(4-methyl-4,5-dihydrooxazole)]
phenylene-1-[2(4-phenyl-4,5-dihydrooxazole)]-3-[2(4-ethyl-4,5-dihydrooxazole)]
phenylene-1-[2(4-phenyl-4,5-dihydrooxazole)]-4-[2(4-ethyl-4,5-dihydrooxazole)]
phenylene-1-[2(4-phenyl-4,5-dihydrooxazole)]-3-[2(5-methyl-4,5-dihydrooxazole)]
phenylene-1-[2(4-phenyl-4,5-dihydrooxazole)]-4-[2(5-methyl-4,5-dihydrooxazole)]
1-[2(5,6-Dihydro-4H-1,3-Oxazinyl)]-4-[2(4,5-dihydrooxazolyl)]butane
1-[2(4-ethyl-4,5-dihydrooxazolyl)]-4-[2(4,5-dihydrooxazolyl)]butane
1-[2(4-methyl-4,5-dihydrooxazolyl)]-4-[2(4,5-dihydrooxazolyl)]butane
1-[2(5-methyl-4,5-dihydrooxazolyl)]-4-[2(4,5-dihydrooxazolyl)]butane
1-[2(4-phenyl-4,5-dihydrooxazolyl)]-4-[2(4,5-dihydrooxazolyl)]butane
1-[2(4-ethyl-4,5-dihydrooxazolyl)]-4-[2(5,6-dihydro-4H-1,3-oxazinyl)]butane
1-[2(4-methyl-4,5-dihydrooxazolyl)]-4-[2(5,6-dihydro-4H-1,3-oxazinyl)]butane
1-[2(5-methyl-4,5-dihydrooxazolyl)]-4-[2(5,6-dihydro-4H-1,3-oxazinyl)]butane
1-[2(4-phenyl-4,5-dihydrooxazolyl)]-4-[2(5,6-dihydro-4H-1,3-oxazinyl)]butane
1-[2(4-phenyl-4,5-dihydrooxazolyl)]-4-[2(4-ethyl-4,5-dihydrooxazolyl)]butane
1-[2(4-phenyl-4,5-dihydrooxazolyl)]-4-[2(4-methyl-4,5-dihydrooxazolyl)]butane
1-[2(4-phenyl-4,5-dihydrooxazolyl)]-4-[2(5-methyl-4,5-dihydrooxazolyl)]butane
1-[2(4-ethyl-4,5-dihydrooxazolyl)]-4-[2(4-methyl-4,5-dihydrooxazolyl)]butane
1-[2(4-ethyl-4,5-dihydrooxazolyl)]-4-[25-methyl-4,5-dihydrooxazolyl)]butane 2,2'-(1,4-butylene)-bis[4-phenyl-4,5-dihydrooxazole]
2,2'-(1,4-butylene)-bis[4-ethyl-4,5-dihydrooxazole]
2,2'-(1,4-butylene)-bis[5-methyl-4,5-dihydrooxazole]
2,2'-(1,4-butylene)-bis[4-methyl-4,5-dihydrooxazole]
1-[2(5,6-dihydro-4H-1,3-oxazinlyl)]-3-[2(4,5-dihydrooxazolyl)]-3-methylpropane
1-[2(4-ethyl-4,5-dihydrooxazolyl)]-3-[2(4,5-dihydrooxazolyl)]-3-methylpropane
1-[2(5-methyl-4,5-dihydrooxazolyl)]-3-[2(4,5-dihydrooxazolyl)]-3-methylpropane
1-[2(4-methyl-4,5-dihydrooxazolyl)]-3-[2(4,5-dihydrooxazolyl)]-3-methylpropane
1-[2(4-phenyl-4,5-dihydrooxazolyl)]-3-[2(4,5-dihydrooxazolyl)]-3-methylpropane 2,2'-(3-methyl-1,3-propenyl)-bis[4-phenyl-4,5-dihydrooxazole]2,2'-(3-methyl-1,3-propenyl)-bis[4-ethyl-4,5-dihydrooxazole]2,2'-(3-methyl-1,3-propenyl)-bis[4-methyl-4,5-dihydrooxazole]
1-[2(4-ethyl-4,5-dihydrooxazolyl)]-3-[2(4-methyl-4,5-dihydrooxazolyl)]-3-methylpropane
1-[2(4-ethyl-4,5-dihydrooxazolyl)]-3-[2(5-methyl-4,5-dihydrooxazolyl)]-3-methylpropane
1-[2(4-methyl-4,5-dihydrooxazolyl)]-3-[2(4-ethyl-4,5-dihydrooxazolyl)]-3-methylpropane
1-[2(5-methyl-4,5-dihydrooxazolyl)]-3-[2(4-ethyl-4,5-dihydrooxazolyl)]-3-methylpropane
1-[2(4-methyl-4,5-dihydrooxazolyl)]-3-[2(5-methyl-4,5-dihydrooxazolyl)]-3-methylpropane
1-[2(5-methyl-4,5-dihydrooxazolyl)]-3-[2(4-methyl-4,5-dihydrooxazolyl)]-3-methylpropane
1-[2(5-phenyl-4,5-dihydrooxazolyl)]-3-[2(4-ethyl-4,5-dihydrooxazolyl)]-3-methylpropane
1-[2(4-ethyl-4,5-dihydrooxazolyl)]-3-[2(4-phenyl-4,5-dihydrooxazolyl)]-3-methylpropane
1-[2(4,5-dihydrooxazolyl)]-3-[2(5,6-dihydro-4H-1,3-oxazinyl)]-3-methylpropane
1-[2(4,5-dihydrooxazolyl)]-3-[2(4-ethyl-4,5-dihydrooxazolyl)]-3-methylpropane
1-[2(4,5-dihydrooxazolyl)]-3-[2(5-methyl-4,5-dihydrooxazolyl)]-3-methylpropane
1-[2(4,5-dihydrooxazolyl)]-3-[2(4-methyl-4,5-dihydrooxazolyl)]-3-methylpropane
1-[2(4,5-dihydrooxazolyl)]-3-[2(4-phenyl-4,5-dihydrooxazolyl)]-3-methylpropane
2,2'-(1,3-phenylene)-bis[4,4-dimethyl-4,5-dihydrooxazole]
2,2'-(1,4-phenylene)-bis[4,4-dimethyl-4,5-dihydrooxazole]
1-[2(4,5-dihydrooxazolyl)-3-[2(4,4-dimethy-4,5-dihydrooxazolyl)]-3-benzene
1-[2(4,5-dihydrooxazolyl)-4-[2(4,4-dimethy-4,5-dihydrooxazolyl)]-3-benzene
1-[2(5,6-dihydro-4H-1,3-oxazinyl)]-3-[2(4,4-dimethyl-4,5-dihydrooxazolyl)]benzene
1-[2(5,6-dihydro-4H-1,3-oxazinyl)]-4-[2(4,4-dimethyl-4,5-dihydrooxazolyl)]benzene
2,2'-(1,3-phenylene)-bis[4,5,6,7-tetrahydrooxazepine]
2,2'-(1,4-phenylene)-bis[4,5,6,7-tetrahydrooxazepine]
1-[2(4,5,6,7-tetrahydrooxazepinyl)]-4-[2(4,5-dihydrooxazolyl)]benzene
1-[2(4,5,6,7-tetrahydrooxazepinyl)]-3-[2(4,5-dihydrooxazolyl)]benzene
1-[2(4,5,6,7-tetrahydrooxazepinyl)]-4-[2(5,6-dihydro-4H-1,3-oxazinyl)]benzene
1-[2(4,5,6,7-tetrahydrooxazepinyl)]-3-[2(5,6-dihydro-4H-1,3-oxazinyl)]benzene.

This invention is further illustrated in the following representative examples:

EXAMPLE 1

A statistical mixture of six bisoxazoline, bisoxazine, and substituted oxazoline-oxazine compounds, consisting of:
2,2'-(1,3-phenylene)bis[4,5-dihydrooxazole],
2,2'-(1,3-phenylene)-bis[5,6-dihydro-4H-1,3-oxazine],
2,2'-(1,3-phenylene)-bis[5-methyl-4,5-dihydrooxazole],
1-[2(5,6-dihydro-4H-1,3-oxazinyl)]-3-[2(4,5-dihydrooxazole)]benzene,
1-[2(5-methyl-4,5-dihydrooxazolyl)]-3-[2(4,5-dihydrooxazolyl)]benzene,
1-[2(methyl-4,5-dihydrooxazolyl)]-3-[2(5,6-dihydro-4H-1,3-oxazinyl)]benzene,
with several of the latter compounds existing also as D, L, DD, DL and LL forms, was prepared as follows:

A mixture of isophthalonitrile (2.0 mol, 256 g), 2-aminoethanol (1.5 mol, 92 g), 3-aminopropanol (1.5 mol, 113 g), xylene (1.5 l), and cadmium nitrate (20 g) catalyst was heated under nitrogen for 20 hours at 120° C. The reaction progress was followed by trapping the evolved ammonia in an HCl acid trap. The NH$_4$Cl collected was dried and weighed, obtaining 103 g of NH$_4$Cl. This showed approximately 98% conversion of nitrile to cyclic imino ether. The mixture was washed with water to remove amino alcohols, dried, and the xylene removed under reduced pressure, giving 390 g of product. The mixture consisted essentially of six compounds, neglecting to count optical isomers, having a molecular weight range of 216–244 and an average of 234.5 per various weight fraction of monomers. The mixture was found to be a white paste at room temperature and a liquid at 50° C., having a viscosity of <100 cps.

A sample of the above mixture of bisoxazoline-bisoxazine compounds (24 g) was combined with 36 g of Alnovol PN-320 Novolac (American Hoechst, phenol free phenolic resin molecular weight 3000–4000), and 0.6 g of diphenyl phosphite catalyst. The clear mixture was heated at 175° C., showing a gel time of 5 minutes. The neat resin casting, post cured 1 hour at 175° C., showed a Tg of 149° C. In a comparative experiment in which the same weight ratios of 2,2'-(1,3-phenylene)-bis[4,5-dihydrooxazole], Alnovol PN 320, and diphenyl phosphite was used the gel time was also about 5 minutes, and the Tg of the post cured neat resin was 154° C.

The advantage of the above is that the phenolic resin and oxazoline-oxazine mixture may be readily mixed <100° C., in contrast to about the 150° C. required when using the pure 2,2'-(1,3-phenylene)-bis[4,5-dihydrooxazole]. Further, in spite of the use of five reactive diluents, i.e., additional bisoxazoline, bisoxazine, etc., in place of some of the 1,3-phenylene-bisoxazoline, the TG of the cured system (neat resin) was not drastically affected.

EXAMPLE 2

The procedure of Example 1 was followed using a mixture consisting of 192 g (1.5 mol) of isophthalonitrile, 64 g (0.5 mol) of terephthalonitrile, 153 g (2.5 mol) of 2-aminoethanol, 112.5 (1.5 mol) of 3-aminopropanol, 20 g (0.25 mol) of 1-amino-2-propanol, 25 g (0.25 mol) of 2-amino-1-butanol, 20 g of zinc acetate, and 1.5 l of xylene. The solution was heated under nitrogen for 10 hours at 120° C., resulting in 208 g of isolated NH$_4$Cl (theory, 212 g) and 504 g of mixed monomers. This shows high conversion was obtained, i.e., 98% of nitrile groups were converted to cyclic imino ethers. The mixture, statistically containing principally 2,2'-(1,3-phenylene)-bis-[4,5-dihydrooxazole], and 2,2'-(1,4-phenylene)-bis-[4,5-dihydrooxazole], consisted of twenty different bisoxazolines, bisoxazines and molecules with mixed oxazoline-oxazine residues. In addition to the various optical isomers, the other 18 reactive diluents which were produced in this process are:

2,2'-[1,3-phenylene)-bis[5,6-dihydro-4H-1,3-oxazine],
2,2'-(1,4-phenylene)-bis[5,6-dihydro-4H-1,3-oxazine],
1-[2(4,5-dihydrooxazolyl)]-3-[2(5,6-dihydro-4H-1,3-oxazinyl]benzene,
1-[2(5,6-dihydro-4H-1,3-oxazinyl]-4-[2(4,5-dihydrooxazolyl)]benzene,
2,2'-(1,3-phenylene)-bis[5-methyl-4,5-dihydrooxazole],
2,2'-(1,4-phenylene)-bis[5-methyl-4,5-dihydrooxazole],
1-[2(5-methyl-4,5-dihydrooxazolyl)]-3-[2(4,5-dihydrooxazolyl)]benzene,
1-[2(5-methyl-4,5-dihydrooxazolyl)]-4-[2(4,5-dihydrooxazolyl)]benzene,
1-[2(5-methyl-4,5-dihydrooxazolyl]-3-[2(5,6-dihydro-4H-1,3-oxazinyl)]benzene,
1-(2[5-methyl-4,5-dihydrooxazolyl]-4-[2(5,6-dihydro-4H-1,3-oxazinyl)]benzene,
2,2'-(1,3-phenylene)-bis [4-ethyl-5,6-dihydrooxazole],
2,2'-(1,4-phenylene)-bis [4-ethyl-5,6-dihydrooxazole],
1-[2(4-ethyl-4,5-dihydrooxazolyl)]-3-[2(4,5-dihydrooxazolyl)]benzene,
1-[2(4-ethyl-4,5-dihydrooxazolyl)]-4-[2(4,5-dihydrooxazolyl)]benzene,
1-[2(4-ethyl-4,5-dihydrooxazolyl)]-3-[2(5,6-dihydro-4H-1,3-oxazinyl)]benzene,
1-[2(4-ethyl-4,5-dihydrooxazolyl)]-4-[2-(4,5-dihydrooxazolyl)]benzene,
1-[2(4-ethyl-4,5-dihydrooxazolyl)]-3-[2(5-methyl-4,5-dihydrooxazolyl)]benzene, and
1-[2(4-ethyl-4,5-dihydrooxazolyl)]-4-[2(5-methyl-4,5-dihydrooxazolyl)]benzene.

The mixture was found to be a liquid at room temperature, containing mainly 2,2'-(1,4-phenylene)-bis[4,5-dihydrooxazole] and 2,2'-(1,4-phenylene)bis[4,5-dihydrooxazole] mixed with the above-described eighteen different reactive diluent compounds. The mixture had a viscosity of 700 cps at 25° C. and 200 cps at 45° C.

Alnovol phenolic resin (American Hoechst Novolac PN 320 molecular weight 2000-4000), 60% by weight, was combined with the above bisoxazoline-bisoxazine mixture, 40% by weight and 1% by weight of triphenyl phosphite catalyst at below 100° C. The reactive mixture gelled in 9 min. at 175° C. After post curing for 2 hours at 220° C., the neat resin casting exhibited a TG of 146° C., flex strength of 22,800 psi and flex modulus of 704,600 psi. These properties are close to those obtained by using a mixture of pure 2,2'-(1,3-phenylene)-bis[4,5-dihydrooxazole]: Alnovol PN30 in the same ratio (40:60) with the same weight percent triphenyl phosphite catalyst, i.e., 154° C. Tg, 22,000 psi flex strength, and 780,000 psi flex modulus.

EXAMPLE 3

The procedure of Example 1 was followed, using 1,4-dicyanobenzene (terephthalonitrile) (256 g, 2.0 mol), 125.5 g (2.5 mol) of 2-aminoethanol, 75 g (1.0 mol) of 2-aminopropanol, 44.5 g (0.5 mol) of 2-amino-1-butanol, 10 g of zinc acetate, and 1 l of xylene. The product mixture, containing six different bisoxazolines and bisoxazines, e.g., 2,2'-(1,4-phenylene)-bis[4,5-dihydrooxazole],
2,2'-(1,4-phenylene)-bis[4-ethyl-4,5-dihydrooxazole],
2,2'-(1,4-phenylene)-bis[4,5-dihydro-4H-1,3-oxazine],
1-[2(4,5-dihydro-4H-1,3-oxazinyl)]-4-[2(4,5-dihydrooxazolyl)]benzene,
1-[2(4-ethyl-4,5-dihydrooxazolyl)]-4-[2(4,5-dihydrooxazolyl)]benzene, and
1-[2(4-ethyl-4,5-dihydrooxazolyl)]-4-[2(4,5-dihydrooxazinyl)]benzene, and also containing a statistical distribution of D, L, DL, DD, and LL optical isomer forms, was obtained in 98% conversion of the dinitrile, as evidenced by the 210 g of dry NH$_4$Cl collected after reaction for 12 hours at 120° C. The product was found to be soluble in a variety of common solvents such as acetone, and had a melting point of less than 100° C. In contrast, pure 2,2'-(1,4-phenylene)-bis[4,5-dihydrooxazole] melts at 254° C. and is practically insoluble in common solvents such as acetone, alcohols, etc. A cured neat resin sample was prepared in accordance with the procedure of Example 1 from 70% by weight of Alnovol PN 320 and 30% by weight of the above-described oxazoline-oxazine mixture exhibited a TG of 134° C. In contrast, a neat resin sample cured under the same conditions with 30% pure 2,2'-(1,4-phenylene-bis [4,5-dihydrooxazole] and 70% Alnovol PN 320 exhibited a Tg of 140° C. In another experiment a cured resin sample was prepared from 40% by weight of Alnovol PN 320 and 60% by weight of the oxazoline-oxazine mixture, of this example with the cured sample showing a Tg of 230° C. Such a ratio of reactants as is produced by the process of this invention cannot be prepared from pure 2,2'-(1,4-phenylene)-bis[4,5-dihydrooxazole] because the pure oxazoline is essentially insoluble in the Alnovol at the foregoing process temperatures.

We claim:
1. The composition having a melting point below 100° C. consisting of a mixture of two or more structurally dissimilar compounds having the formula

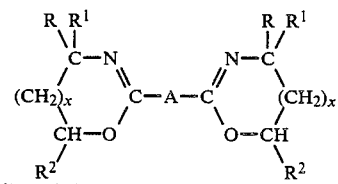

wherein
A represents a cyclic or acyclic aliphatic or substituted cyclic or acyclic aliphatic moiety having from 1 to 20 carbon atoms or an aromatic mono- or multi-nuclear or aliphatic substituted aryl residue having from 6 to 20 carbon atoms,
R independently represents H, CH$_3$, CH$_2$CH$_3$ or C$_6$H$_5$,
R$^1$ independently represents H or CH$_3$,
R$^2$ independently represents H or CH$_3$, and
x represents an integer of from 0 to 2.

2. The composition of claim 1 composed of a mixture of
2,2'-(1,3-phenylene)-bis[4,5-dihydrooxazole],
2,2'-(1,3-phenylene)-bis[5,6-dihydro-4H-1,3-oxazine],
2,2'-(1,3-phenylene)-bis[5-methyl-4,5-dihydrooxazole].
1-[2(5,6-dihydro-4H-1,3-oxazinyl)]-3-[2(4,5-dihydrooxazole)]benzene,
1-[2(5-methyl-4,5-dihyrooxazolyl)]-3-[2(4,5-dihyrooxazolyly)]benzene, and 1-[2(methyl-4,5-dihydrooxazolyl)]-3-[2(5,6-dihydro-4H-1,3-oxazinyl)]benzene.

3. The composition of claim 1 composed of
2,2'-(1,4-phenylene)-bis[4,5-dihydrooxazole],
2,2'-(1,4-phenylene)-bis[4-ethyl-4,5-dihydrooxazole],
2,2'-(1,4-phenylene)-bis[4,5-dihydro-4H-1,3-oxazine],
1-[2(4,5-dihydro-4H-1,3-oxazinyl)]-4-[2(4,5-dihydrooxazolyl)]benzene,
1-[2(4-ethyl-4,5-dihydrooxazolyl)]-4-[2(4,5-dihydrooxazolyl)]benzene, and
1-[2(4-ethyl-4,5-dihydrooxazolyl)]-4-[2(4,5-dihydrooxazinyl)]benzene.

* * * * *